May 11, 1965

A. GEMASSMER 3,183,112

ISOCYANATES AND METHOD OF PREPARING SAME

Filed Dec. 4, 1956

INVENTOR:
Alois Gemassmer

By Clelle W. Tipschmel
ATTORNEY.

3,183,112
ISOCYANATES AND METHOD OF
PREPARING SAME
Alois Gemassmer, Cologne-Stammheim, Germany, assignor of one-half to Farbenfabriken Bayer Aktiengesellschaft, Leverkusen, Germany, a corporation of Germany, and one-half to Mobay Chemical Company, Pittsburgh, Pa., a corporation of Delaware
Filed Dec. 4, 1956, Ser. No. 626,253
Claims priority, application Germany, Dec. 6, 1955, F 18,992
9 Claims. (Cl. 106—316)

This invention relates generally to the manufacture of compounds having at least one unreacted —NCO group and more particularly to a novel method for making such compounds containing a limited amount of side reaction products and substantially free from the diisocyanate used in their manufacture. Still more particularly, the invention relates to a method for making compounds having at least one unreacted —NCO group that are substantially free from toxic compounds of relatively high vapor pressures at ordinary room temperatures.

Organic compounds having unreacted —NCO groups are used extensively in making plastic compositions. The more commonly used compounds of this type are the mono- and polyisocyanates from which impurities may be removed by vacuum distillation. These compounds may be either aliphatic or aromatic and usually the aliphatic isocyanates will contain from 2 to 12 carbon atoms. Examples of such isocyanates include hexamethylene diisocyanate, toluylene diisocyanate, thiodipropyl diisocyanate, pentamethylene diisocyanate, chlorophenylene diisocyanate, phenylene diisocyanate and the like. These isocyanates are not entirely suitable for the preparation of lacquers, however, because they have a relatively high vapor pressure at temperatures at which they must be handled and are toxic. It has therefore been proposed, for example, in German Patent 870,400, that these isocyanates should be reacted with a polyhydric alcohol having from 2 to 4 hydroxyl groups in the proportion of at least one mol of diisocyanate per hydroxyl group. Compounds having both reacted and unreacted —NCO groups are obtained from such a reaction and, because of their higher molecular weight, these reaction products have a relatively low vapor pressure and thus are not undesirable because of their toxicity. In accordance with this process, the isocyanate is diluted with a solvent therefor and the resulting solution is added to a predetermined amount of a polyhydric compound. In spite of the fact that only one mol of diisocyanate is provided for each hydroxyl group, the resulting product often contains as much as 10 to 15 percent or more unreacted diisocyanate which is toxic and, because of its high vapor pressure, harmful vapors are evolved as the reaction product is used in formulating lacquers.

It has been proposed also, in order to avoid the presence of low vapor pressure toxic diisocyanates, to mix the diisocyanates with a polyhydric alcohol in such proportions as to provide less than the required amount of molecules of diisocyanate to react with each hydroxyl group. In other words, less than two but more than one —NCO groups are provided for each hydroxyl group. The product resulting from such a reaction has a low vapor pressure and is therefore not undesirable because of toxicity characteristics, but, at the same time, the number of available unreacted —NCO groups in this product is less than the theoretical amount when one mol of a diisocyanate is provided for each hydroxyl group. Compounds having this reduced amount of available unreacted —NCO groups are obviously disadvantageous.

It is therefore an object of this invention to provide a novel method and apparatus for making compounds having unreacted —NCO groups which are substantially devoid of unreacted diisocyanate compounds and contain only a controlled and limited amount of side reaction products of high molecular weight. Another object of the invention is to provide a method for making a compound having unreacted —NCO groups that has a relatively low vapor pressure and is advantageous for use in the manufacture of lacquers. A further object of the invention is to provide a method for making organic compounds having nearly the theoretically possible percentage of available —NCO groups and containing less than undesirable amounts of unreacted diisocyanates. A still further object of the invention is to provide an improved process for making organic compounds from diisocyanates and organic compounds having at least one reactive hydrogen atom that are of relatively low molecular weight and substantially free from unreacted diisocyanates. Still another object of the invention is to provide an improved process for making organic compounds having unreacted —NCO groups from organic compounds having a reactive hydrogen atom and a diisocyanate which process avoids any considerable amount of reaction between —NCO groups and the —NHCOR— group wherein R is the radical of the organic compound having the reactive hydrogen atom and provides a reaction product substantially free from any diisocyanate. Still another object of the invention is to provide organic compounds having approximately the theoretical amount of unreacted —NCO groups and contain only minor amounts of side reaction products and diisocyanate compounds or contain substantially none of these materials.

Other objects will become apparent from the following descriptions with reference to the accompanying drawing in which FIGURE 1 illustrates diagrammatically an apparatus suitable for use in practicing one embodiment of the invention;

Figure 1:
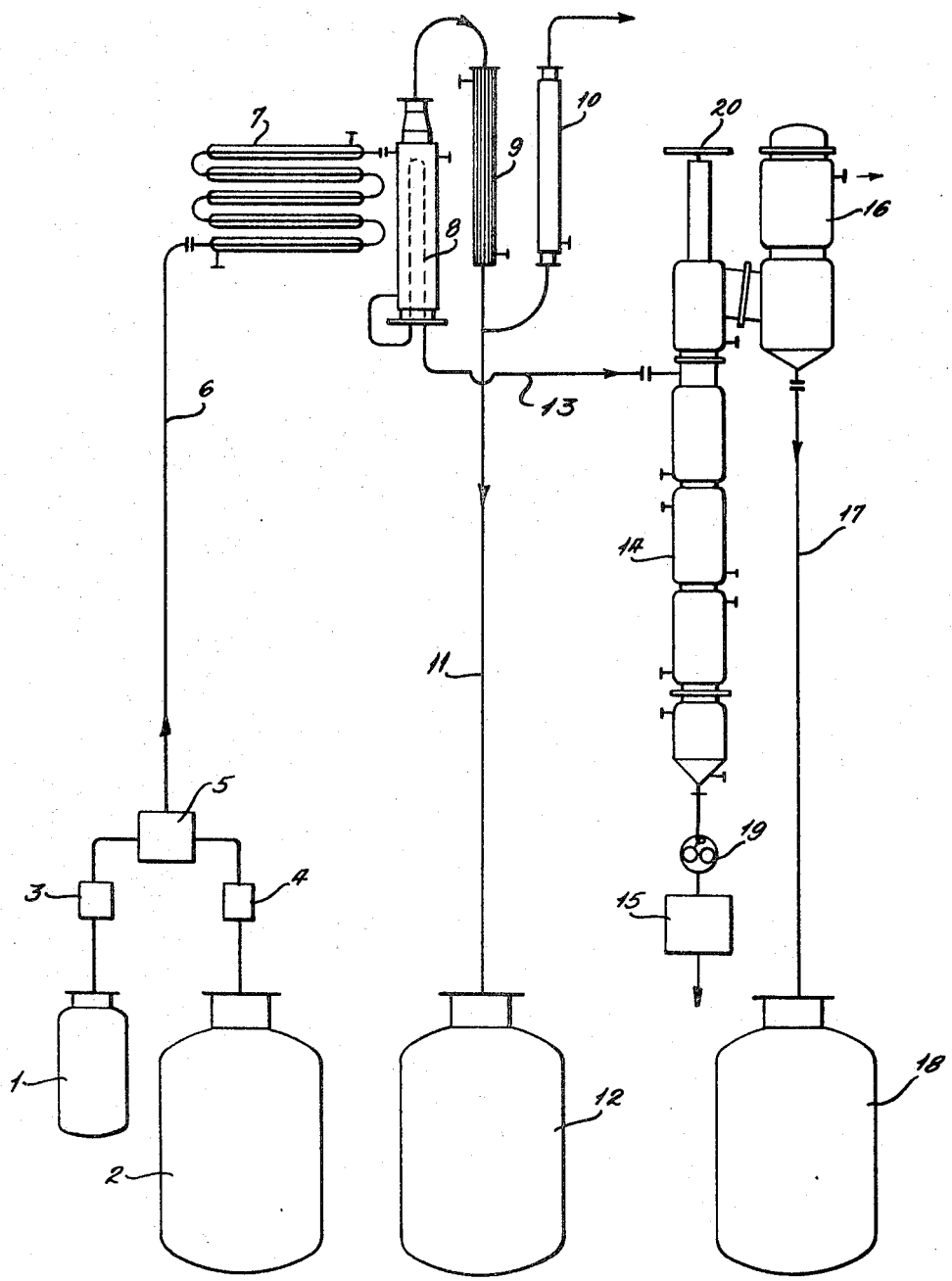

Generally speaking, the objects of the invention are achieved by providing a method wherein a diisocyanate is mixed with an organic compound having a reactive hydrogen atom in a ratio such that more mols of a compound having two —NCO groups are present than are required for each of the reactive hydrogen atoms present to react with a different molecule of the diisocyanate compound and thereafter removing the unreacted diisocyanate compound from the reaction mixture by heating a flowing stream or film thereof under conditions which avoid quiescence and avoid any portion of the mixture from remaining at distillation temperatures for any appreciable length of time. The invention provides a process for preparing the reaction product of a diisocyanate and an organic compound having a reactive hydrogen atom which contains about 80% or more by weight of the theoretical amount of available —NCO groups and less than 2% unreacted diisocyanate by distilling at a temperature of 150° C. or more under conditions which avoid quiescence.

In practicing this invention, the diisocyanate and the organic compound having the reactive hydrogen atoms are mixed together and reaction between the two is brought about to produce a low molecular weight compound. The following chemical equation is representative of the reaction:

(1) $R_1(OH)_n + OCNR_2NCO = R_1(OOCNHR_2NCO)_n$ 

$R_1$ and $R_2$ may be either an aliphatic or an aromatic organic radical and $n$ is at least one and usually not more than five. When the product in the foregoing equation is heated in the presence of a compound having an unreacted —NCO group to above about 100° C., there is a tendency for the —NCO group to react with the hydrogen atom on the urethane linkage. This reaction is ordinarily most rapid at temperatures of about 150° C. and above. The eventual result of such side reactions is a product having an undesirable molecular weight. This reaction is represented by the following equation:

(2)

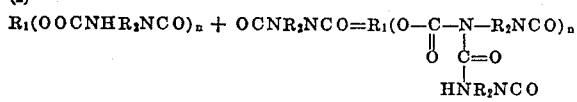

It has been found in accordance with this invention that in spite of the tendency for the side reaction product to be formed under temperature conditions of above about 100° C. and particularly at 150° C. and above, it is possible to remove substantially all of the unreacted diisocyanate from the reaction product in Equation 1 above by distillation at temperatures of 150° C. and higher provided the distillation is such that the dwell above 100° C. is for only a short duration of time. In other words, it has been found that the unreacted diisocyanate may be removed from the reaction product with a limited amount of side reaction by distillation at temperatures above 150° C. and preferably at about 180° C. provided the reaction product is exposed to such temperatures for only a short period of time. If desired, the amount of side reaction can be controlled by varying the temperature or time at the temperature under controlled conditions and a product having a predetermined amount of side reaction product may be made. In all instances, however, temperatures above about 250° C. must be avoided. It should be noted that undesirable quantities of the side reaction product are avoided in accordance with this invention even when heating of the mixture of reaction product and diisocyanate is to temperatures above 150° C. by controlling other conditions to avoid quiescence and to insure that exposure to these temperatures for any appreciable time will be avoided.

In a preferred embodiment of the invention at least the last portion of the diisocyanate is removed in a falling film evaporator. In order to insure that quiescence is avoided, the falling film evaporator is provided with a mechanical agitator or other suitable means for agitating the film as it flows down the wall of the evaporator. As least that portion of the diisocyanate which reduces the concentration thereof in the product from about 10% to less than 2% should be removed under conditions such as those provided in the falling film evaporator.

In contrast to the heretofore available reaction product between the diisocyanate and the organic compound having the reactive hydrogen atom, the product provided by this invention has a maximum amount of unreacted —NCO groups and at the same time is substantially free from the toxic diisocyanate. The invention provides a product containing available —NCO groups in an amount of 80% of theoretical or more with less than about 2% diisocyanate. In all cases, the diisocyanate content must be so low that people working with it are not disturbed. Heretofore, in order to produce a compound having such a quantity of unreacted —NCO groups, i.e., at least 80% of the amount theoretically possible, it has been impossible to remove sufficient diisocyanate to reduce its content to less than about 10%. A preferred product of this invention is prepared from an organic compound of relatively low molecular weight, such as, for example, 1,3-propylene glycol, 1,4-butylene glycol, ethylene glycol, 1,4-butylene glycol, and the like, and contains about from 16% to about 18.5% available —NCO groups and less than 2% unreacted diisocyanate. The product made from a higher molecular weight compound will be less. For example, with castor oil, the product contains about 8% available —NCO groups. Although much of the side reaction is avoided by the process of this invention, a small amount may be present but such side reaction is limited to a point where only about 5 to 15% of the theoretical amount of available —NCO groups in the product are lost. The presence of some side reaction product is desirable but the amount should not exceed the above specified amount. Diisocyanates having a vapor pressure such that they are objectionable in use in lacquer formulations are those contemplated by this invention. Any diisocyanate having a vapor pressure not less than the vapor pressure of toluylene diisocyanate is ordinarily used and is preferred in accordance with this invention. Toluylene diisocyanate is especially preferred.

It is preferred to bring about the reaction between the diisocyanate and the organic compound having the reactive hydrogen atom in a batch process wherein the said organic compound is added to the diisocyanate. The organic compound having the reactive hydrogen atom is added slowly either dropwise or in the form of a small stream into the diisocyanate. In this way, a large excess of diisocyanate is present as the reaction proceeds even though the final ratio of diisocyanate to reaction product may not be particularly large. In other words, the amount of diisocyanate present is great at the beginning of the mixing of the two ingredients together and gradually diminishes as reaction product is formed.

Although this batch type process is preferred, it is also possible to carry out the reaction in a continuous process wherein flowing streams of diisocyanate and organic compound having reactive hydrogen atom are mixed together.

Any suitable organic compound having a reactive hydrogen atom may be utilized, such as, for example, a polyester formed from a polyhydric alcohol and a polycarboxylic acid, but it is preferred to react a polyhydric alcohol with the diisocyanate. The polyester is preferably formed by reacting any suitable dicarboxylic acid such as, for example, adipic, succinic and the like, with any suitable polyhydric alcohol, such as, for example, ethylene glycol, diethylene glycol and the like, in such proportions that the polyester has terminal OH groups. Other suitable glycols and dicarboxylic acids include those disclosed in U.S. Patent 2,729,618.

Examples of polyhydric alcohols suitable for reacting with the diisocyanate include saturated or unsaturated glycols, such as, for example, ethylene glycol, 1,3-propylene glycol, 1,3-butylene glycol, methylhexane-1,6-diol, 1,4-butylene glycol, 1,6-hexanediol, thiodiglycol, 2,2'-dimethyl-1,3-propylene glycol and the like. Trihydric alcohols, such as glycerol, or other polyhydric alcohols, such as erythritol, are also suitable for reacting with the diisocyanate.

The invention also provides a method for making compounds having a low molecular weight and only one unreacted —NCO group per molecule by reacting a diisocyanate with a monohydroxy compound, such as, for example, aliphatic, aromatic or hydroaromatic alcohols, hydroxy acid-esters, monoglycol esters of carboxylic acids, diglycerides with various acid components and the like.

Although the amount of diisocyanate used in excess of that required for reaction with the organic compound having the reactive hydrogen atom may be varied over a wide range, it is necessary that a sufficient amount be utilized to maintain the reaction product in solution unless another solvent for the reaction product is included in the reaction mixture. If less than a sufficient amount of diisocyanate is provided, there is a tendency for an undesirable amount of cross-linking to occur through reaction between —NCO groups and the reactive hydrogen atom on the urethane linkage formed in the reaction between the diisocyanate and the reactive hydrogen compound. Under most conditions, at least about 1.5 mols diisocyanate per hydroxyl group or reactive hydrogen atom in the organic compound should be used to react therewith. However, under some conditions particularly where the reaction is carried out as a batch process as described above, less than 1.5 mols diisocyanate per reactive hydrogen atom may be utilized. A molar excess of about 200% has been found particularly advantageous and this amount is preferred. It has been found that the temperatures during the reaction period should preferably be within the range of about 20° C. to 100° C. and that the solution should be stirred as the reaction proceeds.

One method for reacting the organic compound having the reactive hydrogen atom and the diisocyanate together is to introduce separately the two components into a mixing device, such as, for example, a mixing nozzle of the type disclosed in U.S. Patent 2,764,565, or into any other suitable mixing chamber provided with a mechanical stirring device, such as, for example, a turbomixer or centrifugal pumps.

In some embodiments a solvent for the reaction product other than the diisocyanate may be utilized. Any suitable organic solvent may be used. For example, hydrocarbons, halogenated hydrocarbons, esters, ketones, and any other inert solvent or mixtures thereof which do not react with isocyanates may be included in the reaction mixture. Ethyl acetate and methylethyl ketone have been found particularly well suited for the purpose.

It is essential that quiescence be avoided throughout the process and that the distillation be conducted in a continuous manner. Preferably the continuous distillation is carried out in two or more types of apparatus. In the first step, a portion of the unreacted diisocyanate remaining after the reaction is complete may be removed by passing the same through a tubular heat exchanger, such as a pipe still or tubular heat exchanger, and then into a flash distillation apparatus. The product from this apparatus may then be passed continuously through a falling film evaporator to remove substantially all of the remaining unreacted diisocyanate. However, in some embodiments it is possible to pass the reaction product and the unreacted diisocyanate directly from the reaction vessel into a falling film evaporator and to remove substantially all of the unreacted diisocyanate in this apparatus without having first removed some of it in other types of distillation apparatus.

Referring now to the drawing, the embodiment of the apparatus illustrated diagrammatically includes storage tanks 1 and 2 containing the organic compound having the reactive hydrogen and the diisocyanate, respectively. These materials are transferred by means of pumps 3 and 4 to a suitable mixing chamber 5 where the diisocyanate is mixed with the organic compound having the reactive hydrogen atom. As pointed out hereinbefore, it is preferred to place the desired amount of diisocyanate in mixer 5 and then to add the organic compound having the reactive hydrogen slowly to the diisocyanate while stirring. The reaction product is pumped through conduit 6 and heat exchanger 7 which may be a plurality of jacketed pipes heated by means of steam where the temperature is raised to about 150° C. The reaction product and unreacted diisocyanate is pumped continuously through heater 7 and into flash evaporator 8 where the temperature is raised above the distillation point of the mixture. Some of the diisocyanate is distilled off and condensed by condenser 9 from which it flows through conduit 11 into storage tank 12.

Figure 2:
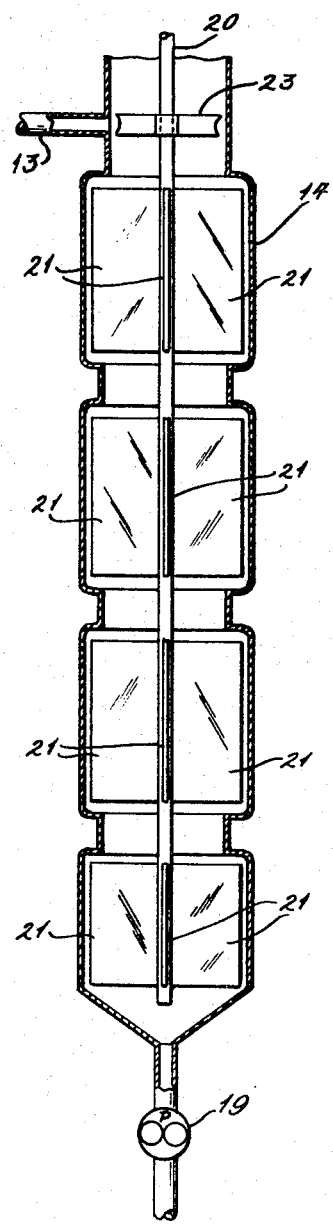
FIGURE 2 is a longitudinal cross-sectional view of a distillation apparatus used in practicing an embodiment of the invention.
Figure 4:
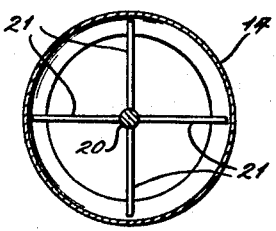
FIGURE 4 is a cross-section of another embodiment of the apparatus of FIGURE 2.
Figure 3:
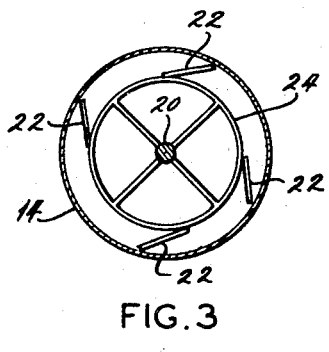
FIGURE 3 is a cross-section of an embodiment of the apparatus shown in FIGURE 2.

The temperature in flask still 8 is preferably from about 100° to about 160° C. The effluent from still 8 flows through pipe 13 into falling film evaporator 14. As shown to best advantage in FIGURE 2, evaporator 14 is provided with agitator 20 having a distributor wheel 23 which tends to distribute the liquid evenly over the walls of chamber 14. The liquid then flows down along the walls of evaporator 14 and is agitated by means of stirrer 20 provided with a plurality of blades 21. It is important in most embodiments that the evaporator be provided with means for avoiding quiescence and an agitator having fins of the type shown in FIGURE 2 and FIGURE 4 has been found particularly advantageous. These fins are of such width that the film of liquid flowing along the wall of evaporator 14 is agitated as the stirrer rotates. Another form of agitator is shown in cross-section in FIGURE 3. This type which is also admirably suited for the purpose is provided with fins 22 which may be made from any resistant material that is not subject to corrosion by isocyanates. Teflon, a cellulose acetate, has been found particularly well suited, but any other resinous material that resists corrosion by an isocyanate may be utilized.

The concentrated product is removed from the evaporator by means of gear pump 24 and is transferred to a suitable container 15. The unreacted diisocyanate is collected in a condenser 16 and flows therefrom to a storage tank 18. The apparatus is evacuated by connecting a suitable vacuum pump to condensers 10 and 16. The pressure within the evaporator should be maintained as near to an absolute vacuum as is possible and preferably within a pressure range of not more than about 5 millimeters.

Although the drawing of a preferred embodiment shows preheater 7 and flash evaporator 8, in some instances the preheater and flash evaporator will not be required and conduit 6 can lead directly to the falling film evaporator eliminating the requirement for the preheating apparatus. However, best results are obtained if the two-zone heating process is utilized. It is advantageous to flush evaporator 14 by pumping a suitable solvent into the bottom thereof which aids in removing the isocyanate vapor therefrom.

*Example 1*

In one embodiment of the invention, about 1,000 parts toluylene diisocyanate consisting of about 65% by weight 1,2,4-toluylene diisocyanate and about 35% by weight 1,2,6-toluylene diisocyanate are moved from storage tank 2 to mixer 5. The temperature is adjusted to about 70° C. and about 89 parts ethylene glycol are added slowly over a period of about 30 to 40 minutes while constantly stirring the liquid in mixer 5. Suitable refrigeration means are provided and the temperature of the vessel is maintained at below about 80° C.

After all of the ethylene glycol has been added, stirring is continued for about one hour and the temperature is maintained at about 70° C. The reaction liquor is then pumped through preheater 7, flash evaporator 8 and passed through falling film evaporator 14. The temperature in 7, 8 and 14 is from about 150° to about 160° C. and the pressure within the apparatus is about 1 mm. The product obtained in 15 is a light yellow transparent and odorless resin containing about 18.4% by weight unreacted —NCO groups. The product is soluble in methylisobutyl ketone and in ethyl acetate concentrations of up to about 40%. The product is soluble in benzene, chlorobenzene, toluene and xylene in concentrations of up to about 20%. It is poorly soluble in aliphatic hydrocarbons. The softening temperature thereof is within the range of from about 80° to about 90° C. The amount of unreacted toluylene diisocyanate in the product is less than about 2% and so small that the odor thereof cannot be detected and the product does not have objectionable toxic characteristics. The amount of side reaction between —NCO groups and the hydrogen atom on the nitrogen of the urethane linkage is limited to a loss of only about 7% by weight of the theoretical amount of available —NCO groups.

*Example 2*

In another embodiment of the invention, about 414 parts by weight hexamethylene diisocyanate are placed in mixer 5 and a mixture of about 11 parts of 1,3-butanediol and 25.7 parts trimethylolpropane are added slowly thereto at the rate used in the above embodiment. After the two have been mixed together, stirring is continued for about three hours while the temperature is maintained at about 70° C. The reaction liquor is then passed through preheater 7, flash evaporator 8 and falling film evaporator 14 under the same conditions of temperature and pressure as in the embodiment above. Unreacted diisocyanate is distilled off in flash evaporator 8 and in falling film evaporator 14 and the vapors are condensed in condensers 9 and 16. The resinous product is a clear, light yellow, viscous liquid containing about 17.7% by weight unreacted —NCO groups. The product is soluble in most of the conventional organic solvents except gasoline, is substantially devoid of any unreacted hexamethylene diisocyanate which would irritate the pituitary membranes and only about 5–10% of the theoretical amount of available —NCO groups have been lost through side reactions.

*Example 3*

In still another embodiment of the invention, about 250 parts toluylene diisocyanate containing about 65% by weight 1,2,4-toluylene diisocyanate and about 35% 1,2,6-toluylene diisocyanate are placed in mixer 5 and about 122 parts castor oil having an hydroxyl number of about 170.7 are added thereto in accordance with the procedure described in conjunction with Example 1. After the two components have been mixed together, stirring is continued for about 30 minutes while the temperature is maintained at about 70° C. The unreacted toluylene diisocyanate is distilled in the apparatus shown in the drawing as described in conjunction with Example 1 and a clear honey-like product containing about 8% by weight unreacted —NCO groups is obtained. No odor of unreacted toluylene diisocyanate can be detected.

*Example 4*

About 212 parts tetramethylene diisocyanate are placed in mixer 5 and about 100 parts melted octadecyl alcohol are added thereto in accordance with the procedure of Example 1. After components have been brought together, the resulting mixture is stirred for about one hour while the temperature is maintained at about 70° C. Turbidity is noticeable after this mixture has been heated for about 10 minutes. The unreacted tetramethylene diisocyanate is removed by distillation in the apparatus of the drawing in accordance with the procedure described in conjunction with Example 1. The product is a clear, syrupy brown liquid containing about 8.7% by weight of unreacted —NCO groups and is practically odorless indicating that about 2% or less free diisocyanate is present.

*Example 5*

Toluylene diisocyanate and a mixture of about 30% by weight trimethylolpropane and about 70% 1,3-butylene glycol are fed continuously to a mixing nozzle 15 at the rate of about 120 parts of the diisocyanate per 10 parts of the mixture per unit of time. The mixture of components is heated to about 70° C. and the product passes through conduit 6 into preheater 7 where it is heated to about 180° C. The liquid then flows into flash evaporator 8 having a temperature of about 180° C. and evacuated at a pressure of about 10 mm. mercury. About 80% of the unreacted toluylene diisocyanate is distilled off in flash evaporator 8 and is condensed in condenser 9. The distillation residue passes through 13 to falling film evaporator 14 which is heated with steam under a pressure of about 20 atmospheres. The pressure in evaporator 14 is about 1 mm. mercury. About 0.02 parts o-dichlorobenzene vapor per one part polyisocyanate is pumped into the bottom of evaporator 14 to flush out the polyisocyanate vapors. The yellowish resin melt flows from the bottom of evaporator 14 and is passed over a pair of cooling rollers to convert the melt into flakes. The flakes are substantially entirely odorless and are readily soluble in ethyl acetate and ketones. The product contains about 17.9% by weight unreacted —NCO groups, is substantially devoid of unreacted diisocyanate and is odorless. Less than 10% of —NCO groups in the product reacted to form a side reaction product.

*Example 6*

About 3,424 parts by weight per unit of time of toluylene diisocyanate and about 294 parts by weight alcohol mixture of about 29.8% butanediol-1,3, about 56.1% trimethylolpropane and 14.1% butanediol-1,4 are fed continuously and separately to a mixing pump 15. The components are heated to about 60° C. before mixing. The resulting mixture is passed through the apparatus shown in the drawing; that is, the preheater 7, the flash evaporator 8 and the falling film evaporator 14. The preheater 7 and the evaporator 8 are heated with steam at a pressure of about 3 atmospheres and the falling film evaporator is heated with steam at a pressure of about 14 atmospheres. The distillation residue coming from evaporator 14 has an —NCO content of about 13.6% and may be dissolved in acetone to form a 75% solution. The product is substantially free from unreacted toluylene diisocyanate.

*Example 7*

About 3,424 parts by weight toluylene diisocyanate are heated to about 60° C. in mixer 15 and about 294 parts of an alcohol mixture of about 29.8% butanediol-1,3, about 63.1% of trimethylolpropane and about 7.1% of butanediol-1,4 are added thereto in about two hours time while the temperature is maintained at about 60° C. The reaction mixture is then continuously pumped to the distillation apparatus such as described above and shown in the drawing. The distillation is carried out under a pressure of about 0.5 mm. of mercury and a temperature of about 180° C. The product contains no detectable amount of unreacted diisocyanate and contains about 18.3% by weight unreacted —NCO groups and about 5% of the —NCO groups were lost through a side reaction.

In order to illustrate the advantage of the process provided by this invention, a series of experiments was run in which a mixture of about 70 parts trimethylolpropane and about 30 parts 1,3-butylene glycol were reacted with toluylene diisocyanate in a ratio such that an excess of about 200% molar toluylene diisocyanate was present. The reaction product was then distilled in conventional laboratory distillation equipment composed of a sidearm flask attached to an inclined water-cooled condenser. Distillation was at 0.9 mm. pressure and was continued at a temperature of from about 130° C. to about 150° C. for about 1.1 hours. At the end of this distillation, the product contained about 9% unreacted toluylene diisocyanate. In a similar process using the same concentration of toluylene diisocyanate and mixture of trimethylolpropane and 1,3-butylene glycol, the mixture was heated to about 142° C. under a pressure of about 1.1 to about 2 mm. The temperature was then maintained for about 2.2 hours at about 140 to about 160° C. while at a pressure of about 2.1 mm. The product contained about 5.6% unreacted toluylene diisocyanate. In still another example, the reaction product of the same type was heated to 150° C. while under a pressure of 1.5 mm. and then distilled at 165° C. for two and one-half hours under a pressure of 2.2 mm. The product contained about 11.4% unreacted diisocyanate. In each of these instances, further heating under these conditions results in an adverse effect on the available —NCO groups in the product.

In an example where a reaction product formed from the same chemicals and in the same proportions as described above was distilled in a falling film evaporator having a temperature of about 165° C. and under a pressure of about .3 mm. The product contained only about 1.3% unreacted toluylene diisocyanate and only a desirable amount of side reaction product.

In still another example where using the falling film evaporator with a temperature of 180° C. and a pressure of about 0.3 mm., the product contained about 1.1% toluylene diisocyanate and was substantially free from side reaction products. Actual exposure time in the evaporator in each of these experiments was about one or two minutes.

The product of this invention containing 2% or less and usually less than 1% unreacted diisocyanate and having at least 80% the theoretical amount of available —NCO groups or from about 16 to about 18.5% available —NCO groups when most polyhydric alcohols are used has been found particularly advantageous for use in preparing lacquers. A product containing unreacted —NCO groups within this range is particularly desirable because of the amount of isocyanate required in preparing the lacquer and because undesirable toxicity is avoided by concentrations of unreacted diisocyanate of less than about 2%. Since a small amount of side reaction does occur when the distillation is brought about at the temperatures disclosed herein, the product also has advantageous solubility characteristics for use in making lacquers. It has been found that if this minimum amount of side reaction occurs the solubility is better than if it is entirely avoided.

Although the invention has been described in detail in the foregoing for the purpose of illustration, it is to be understood that such detail is solely for this purpose and that variations can be made by those skilled in the art in the foregoing embodiments without departing from the spirit and the scope of the invention except as set forth in the claims.

What is claimed is:

1. In the preparation of the reaction product of an organic diisocyanate selected from the group consisting of aromatic, cyclo-aliphatic and acyclic aliphatic diisocyanates and an alcohol having from one to four hydroxyl groups by a process which comprises mixing the diisocyanate with the alcohol in a ratio providing an excess of diisocyanate over that theoretically required for a different molecule of diisocyanate to react with each hydroxyl group of the alcohol and thereafter effecting chemical reaction therebetween whereby the two reactants become joined together through a urethane linkage, the improved method of removing unreacted diisocyanate from the reaction mixture after reaction has ceased which comprises flowing the said reaction mixture as a thin film and heating the film at a temperature above the boiling point of the unreacted diisocyanate but below about 250° C. while agitating the film of reaction mixture to avoid any quiescence, thereby avoiding any substantial amount of reaction between unreacted —NCO groups of the product and said urethane linkages.

2. The process of claim 1 wherein at least 1.5 mols diisocyanate per hydroxyl group of the alcohol are used.

3. The process of claim 1 wherein said diisocyanate is toluylene diisocyanate.

4. The process of claim 1 wherein the film of reaction mixture is heated to a temperature of about 100° C. to about 250° C.

5. The process of claim 1 wherein the alcohol is a mixture of trimethylol propane and a butylene glycol.

6. The process of claim 1 wherein the reaction mixture is flowed through a falling film evaporator and is stirred as it is heated in the evaporator.

7. A a new composition of matter, the reaction product of an organic diisocyanate selected from the group consisting of aromatic, cyclo-aliphatic and acyclic aliphatic diisocyanates with an alcohol having from 1 to 4 hydroxyl groups, said product having the general formula $$(OCNR_1NHCOO)_nR_2$$

wherein $R_1$ represents the nucleus of the organic diisocyanate, $R_2$ represents the nucleus of the alcohol and $n$ is from one to four, said reaction product containing at least about 80 percent of the number of unreacted —NCO groups theoretically possible when a different mol of organic diisocyanate reacts with each hydroxyl group of the alcohol to form a reaction product having the said formula and containing one urethane linkage and one unreacted —NCO group for each hydroxyl group which was present on the alcohol, and, in admixture with said reaction product, the product formed when an —NCO group reacts with at least one of the hydrogen atoms shown in the above formula, the amount of product formed by said reaction with the hydrogen atom being limited to not more than the amount that would be formed by reaction of 15 percent of the theoretically possible —NCO groups of the above formula with said hydrogen atom, said admixture containing less than about 2 percent unreacted organic diisocyanate.

8. The composition of claim 7 wherein the organic diisocyanate is toluylene diisocyanate.

9. The composition of claim 8 wherein the alcohol is a mixture of trimethylol propane and butylene glycol.

References Cited by the Examiner

UNITED STATES PATENTS

| | | | |
|---|---|---|---|
| 1,487,456 | 3/24 | Griffin | 23—263 X |
| 2,284,637 | 6/42 | Catlin | 260—77.5 |
| 2,511,544 | 6/50 | Rinke et al. | 260—77.5 |
| 2,703,810 | 3/55 | Viard | 260—471 |
| 2,733,261 | 1/56 | Seeger et al. | 260—471 |
| 2,855,421 | 10/58 | Bunge et al. | 260—453 |

OTHER REFERENCES

Weissberger: "Technique of Organic Chemistry," IV, pp. 533, 535 (1951).

LEON ZITVER, *Primary Examiner.*

NATHAN MARMELSTEIN, CHARLES B. PARKER,
*Examiners.*